United States Patent Office 3,425,599
Patented Feb. 4, 1969

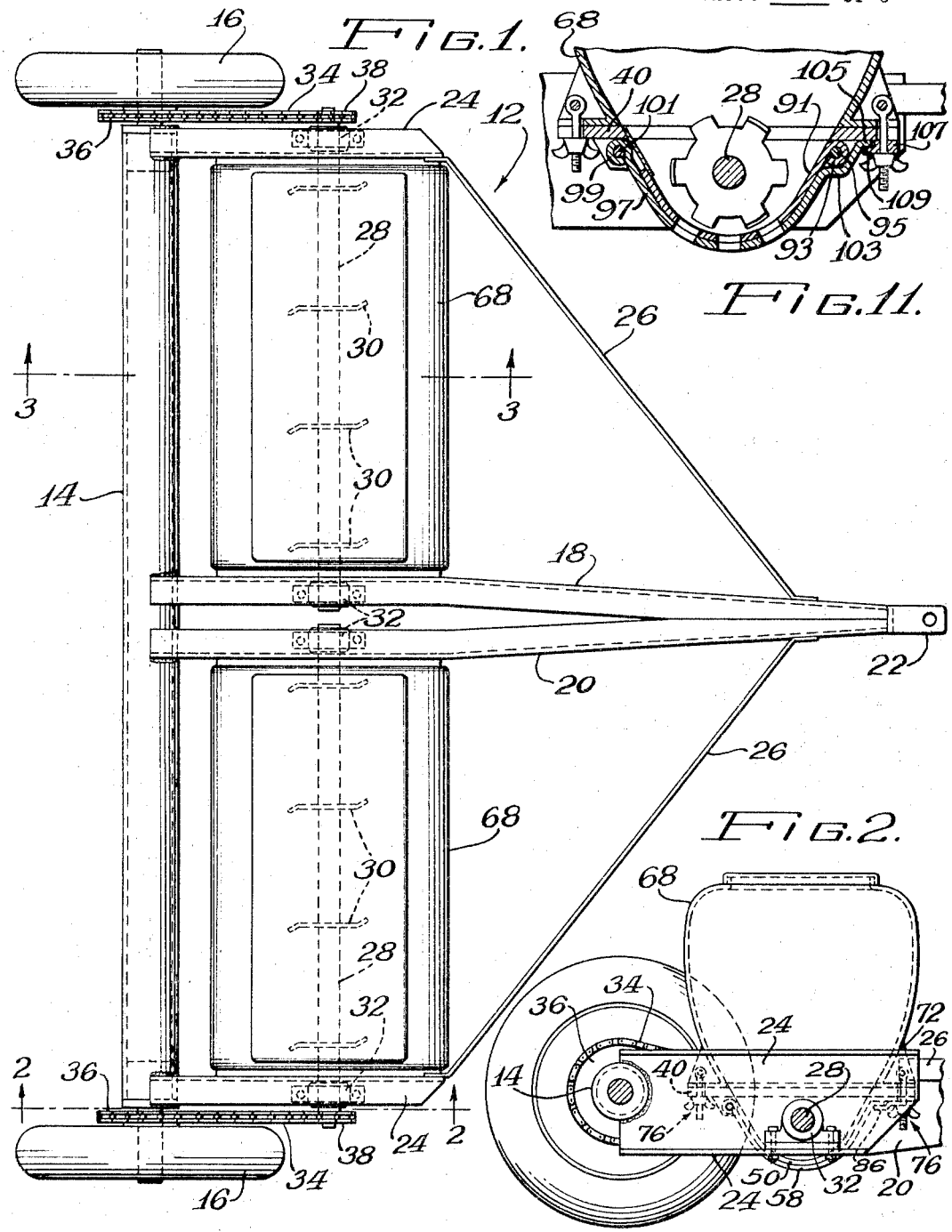

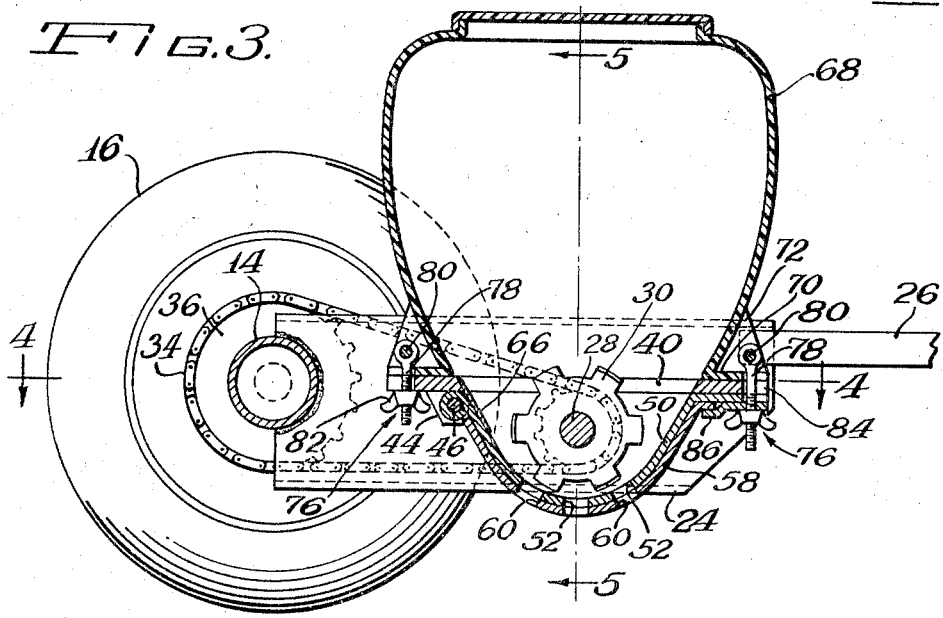
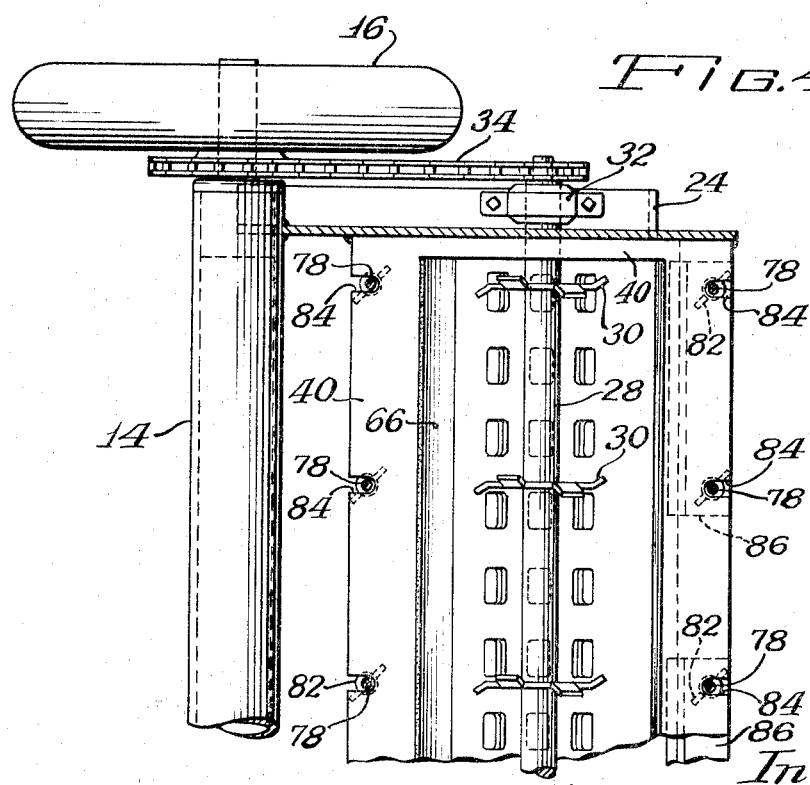

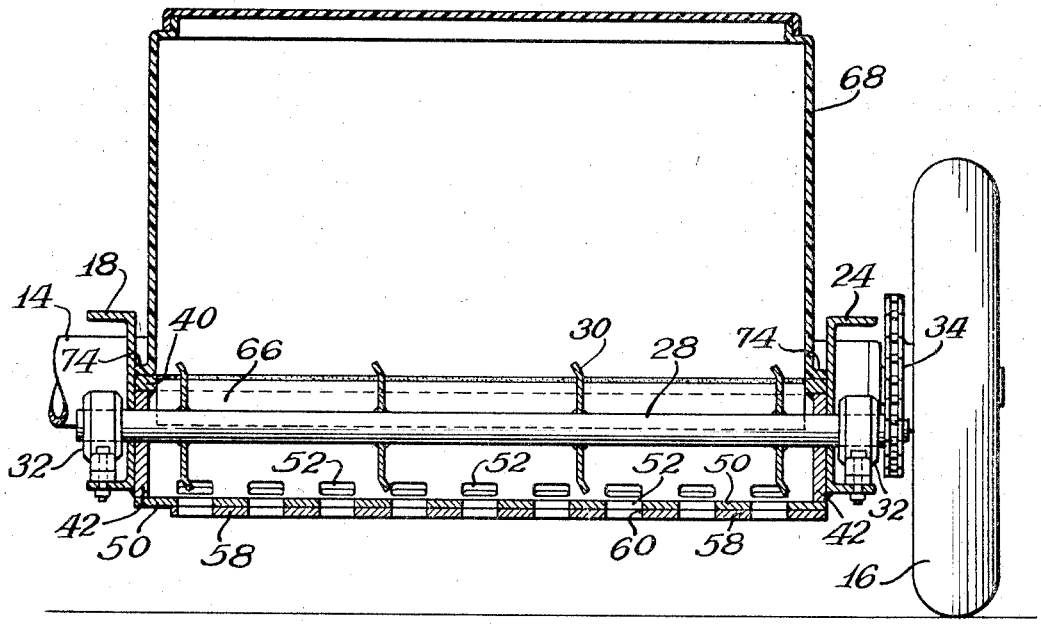
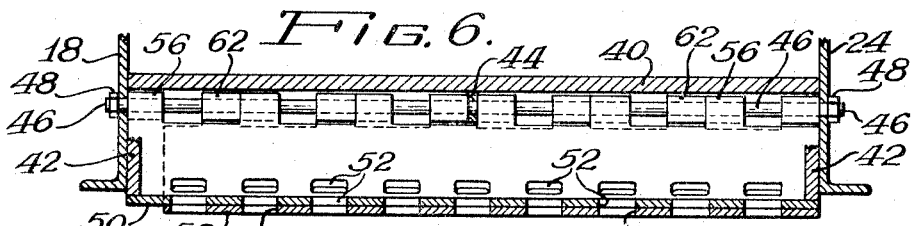
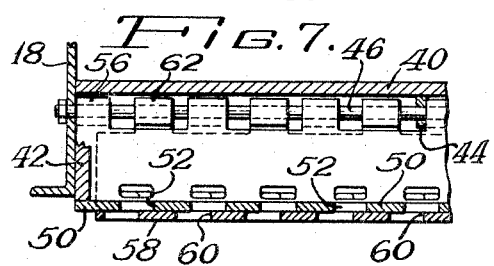
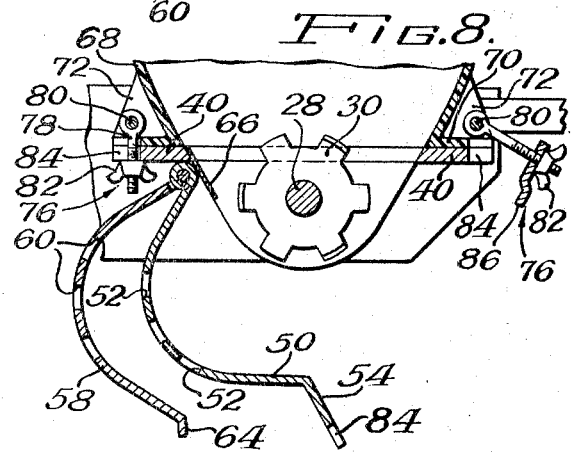
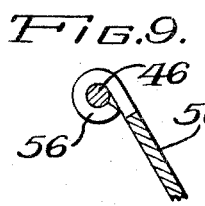
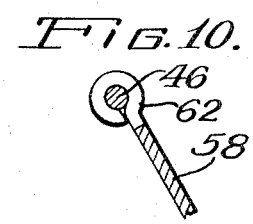

3,425,599
GRAVITY TYPE FERTILIZER SPREADER
Peter Sammarco, Bellwood, and Charles V. Everett, Warrenville, Ill., assignors to International Harvester Company, Chicago, Ill., a corporation of Delaware
Filed Mar. 2, 1967, Ser. No. 619,977
U.S. Cl. 222—177
Int. Cl. B65g 65/48; B60p 1/56, 1/58
11 Claims

ABSTRACT OF THE DISCLOSURE

A gravity type fertilizer spreader having a wheel driven rotor and a frame member. A hopper having an opening positionable on the frame member. A hopper bottom and a slide having dispensing openings, the slide being shiftable relative to the bottom to regulate the flow of fertilizer, are pivotally attached to the frame member. Clamps releasably secure the hopper, the slide and the bottom to the frame in operative position relative to the rotor.

*Background and brief summary of the invention*

The present invention relates to ambulant, gravity flow, dispensing apparatus generally, and more particularly, to such apparatus having flow metering means which are movable to a position providing access to a discharge assistant.

Apparatus for the distribution of fertilizers have long been plagued with problems created by the inherent properties of the fertilizer itself, viz. the corrosiveness of the fertilizers and its propensity to form, after being exposed to moisture, a hard and adherent composition. Such properties have rendered implements inoperative or have increased their cost to a point where they are economically unattractive. These machines are rendered inoperative because the fertilizer hardens or "cakes" between the slide and the hopper bottom making it difficult, if not impossible, to change their relative positions, a procedure necessary to regulate the rate of flow. In addition, the fertilizer can adhere to the slide or the hopper in the vicinity of the rotor and block the flow of the fertilizer. It is, therefore, necessary to clean these members. The implements of the prior art required the machine to be disassembled in order to properly remove any accumulation of adhered fertilizer. This is a time-consuming task, and is especially vexing when the implement is to be used the next day. However, to permit the implement to remain overnight without being cleaned, aggravates the situation because the cool night air causes moisture to condense on the implement, especially on the interior of the hopper where it is readily available to combine with the fertilizer to form a hard, adherent composition.

The most desirable material from which the hopper can be constructed is fiber glass, which material possesses relatively high strength to withstand the weight of the fertilizer, is resistant to corrosion, is lightweight, and is translucent to permit visual determination of the quantity of material remaining therein. However, fiber glass is expensive, and to incorporate such a hopper into an implement that is utilized for but a single purpose only sparingly during the year renders the implement economically impractical.

It is, therefore, an object of this invention to provide a fiber glass hopper which is capable of being fitted to a plurality of implements.

It is also an object to provide a fertilizer spreader which is quickly and easily cleaned and which does not require the use of any tools to accomplish same.

It is a further object to provide a fertilizer spreader in which the rotor does not have to be removed to effect cleaning.

These and other objects and many of the attendant advantages of the present invention will become more readily apparent upon a perusal of the following description and the accompanying drawings.

*Brief description of the drawings*

FIGURE 1 is a top plan view of a fertilizer spreader according to the present invention;

FIGURE 2 is a cross-sectional view taken on line 2—2 of FIGURE 1;

FIGURE 3 is a cross-sectional view taken on line 3—3 of FIGURE 1;

FIGURE 4 is a plan view taken on line 4—4 of FIGURE 3;

FIGURE 5 is a cross-sectional view taken on line 5—5 of FIGURE 3;

FIGURE 6 is a sectional view showing the details of the hinge construction for the hopper bottom and the slide;

FIGURE 6 is a sectional view showing the details of the hinge construction for the hopper bottom and the slide;

FIGURE 7 is a view similar to FIGURE 6 but showing the slide shifted relative to the hopper bottom;

FIGURE 8 is a side elevational view in section showing the slide and bottom pivoted to their open position;

FIGURE 9 is a detail view showing the hinge construction for the bottom;

FIGURE 10 is a detail view of the hinge for the slide; and

FIGURE 11 is a side elevational view in section showing a modified pivot arrangement for the slide and bottom.

*Description of the preferred embodiment*

Referring now to FIGURE 1 there is shown a fertilizer spreader indicated generally at 12 having a tubular cross member 14 to which wheels 16 are journalled at each end. A pair of elongate beams 18 and 20 are secured to the cross tube 14 at its middle portion and extend forward to form a hitch 22 by which the implement may be connected to a tractor or other prime mover for towing. Short cantilever beam sections 24 are secured to each end of the cross tube 14 and are stiffened by support bars 26 connected between the free ends of the beams 24 and the elongate beams 18 and 20. A pair of rotors 28, each of which is provided with a plurality of agitator disks 30, are mounted in bearings 32 carried by the beams 18, 20 and 24, and are driven by a chain 34 meshing with a drive sprocket 36 rotated by the wheel 16 and a smaller driven sprocket 38 secured to the rotors 28. A pair of box frame members 40 are provided, one frame being secured to the beams 18 and 24 and the other beam secured to beams 20 and 24. Each frame member is positioned in a substantially horizontal plane, when the implement is in operating position on level ground, above the rotor 28 but below the outer edge of the agitator disks 30. The inner edges of the frame members 40 are beveled toward the rotor 28 and define an opening. As best shown in FIGURES 5 and 8, end plates 42, each having converging edges joined by a circular section of radius slightly greater than the radius of the disks 30, are attached to the facing web sections of the beams 18 and 24 and beams 20 and 24. A bracket 44, as shown in FIGURES 3 and 6, is secured to each frame member 40 at approximately the middle of the rear cross bar. Axially aligned openings are provided in the webs of beams 18, 20 and 24, in the plates 42, and in the brackets 44 to accept a hinge pin 46, which is secured between adjacent beams by conventional fastening means 48. A hopper bottom 50 having a cross section generally complementary to the plan form of the end plates 42 is provided with dispensing openings 52, a substantially flat, forward extending section 54, and a plurality of intermittent tangential loops 56 formed on the rear portion (see FIGURE 9). The hinge pin 46 extends through the loops 56 and allows the hopper bottom 50 to pivot. A slide member 58 having metering openings 60, which are registerable with the dispensing openings 52, is also pivotally supported from the hinge pin 46 by means of loops 62, which are offset from tangential by the thickness of the hopper bottom 50, as will be seen by comparing FIGURES 9 and 10. The slide member 58 has a cross sectional configuration generally complementary to the hopper bottom 52 and a forward extending section 64. Both of the loops 56 and 62 encircle the hinge pin 46 but are spaced apart to permit the slide member 58 to shift transversely with respect to the hopper bottom 50, thereby permitting the openings 52 and 60 to be positioned out of registry effectively sealing the bottom and preventing the flow of material therethrough, in registry for maximum flow of material, or at any intermediate location to obtain the desired rate of dispensing. A hinge cover plate 66 is secured to the rear cross bar of the frame members 40 and protects the hinge pin 46 and the loops 56 and 62 from the detrimental effects of the fertilizer, thereby assuring both free pivoting of the hopper bottom 52 and the slide member 60 under the influence of gravity and easy shifting of the slide member 60 to regulate the rate of flow.

A hopper 68, which is preferably constructed of fiber glass, is provided with transverse walls which converge to form a smooth continuous surface with the beveled inner edges of the frame member 40 and the hopper bottom 50. Outwardly flared flange members 70 are provided at the lower edges of the transverse walls and are stiffened by webs 72 extending between the flange 70 and the transverse wall. The flange 70 is continuous with a flange 74 formed on the end walls of the hopper 68, which flanges are all supported on the frame member 40 so that the opening therein is registered with the opening defined by the bottom of the hopper 68. The webs 72 support a latch means, indicated generally at 76, which may be of any desired type, but which, as illustrated, comprises a plurality of eyebolts 78 which are pivotally connected to the web 72 by means of pivot pins 80 and which threadedly engage wing nuts 82. The flanges 70 on the hopper 68, the leading edge of the front cross bar and the trailing edge of the rear cross bar of each frame member 40, and the forward extending section 54 are all provided with slots or grooves 84 properly located to accept the eyebolts 78. The eyebolts 78 carried by the web 72 on the rear transverse wall of the hopper 68 are positioned in the slots 84 in flange 70 and the trailing edge of the rear cross bar of the frame member 40 and the wing nuts 84 are threaded thereon to engage the lower surface of the frame member 40. Those eyebolts 78 carried on the front wall of the hopper extend through appropriately positioned holes in a clamping plate 86, which plate is provided with an offset, which is at least equal to the thickness of the slide member 58. This offset prevents the slide member from binding, when the wing nuts are tightened against the plate 86, so that shifting of this member may be facilitated without requiring loosening of these nuts. The offset results in the hopper bottom being firmly secured while the slide is only frictionally retained in position. Thus, when the forward eyebolts 78 are positioned in the slot 84 provided in the flange 70, the leading edge of the frame member 40, and the forward extending section 54, the plate 86 will engage the sections 54 and 64, thereby clamping the hopper 68 and the hopper bottom 50 tightly against the frame member 40, while holding the slide member 58 in elevated position.

Cleaning of the implement constructed according to the present invention involves simply loosening the front wing nuts 82 and swinging the eyebolts about the pin 80. This releases the slide member 58 and the hopper bottom 50 permitting the force of gravity to rotate them about the hinge pin 46. Any material remaining within the hopper would flow out, permitting recovery thereof for later use. Once this is completed, the rear wing nuts are loosened and the eyebolts pivoted to permit the empty, lightweight, fiber glass hopper 68 to be lifted from the frame member 40. In this condition, the entire rotor 28 is exposed and the slide member 58 is separated from the hopper bottom 50. Cleaning may expeditiously be accomplished by thoroughly washing these elements. Reassembly of the implement is easily and quickly accomplished by merely replacing the hopper 68 on the frame member 40, securing the rear wing nuts, swinging both the slide member 58 and the hopper bottom 50 up into position against the bottom of the frame member 40 and fastening the clamping plate 86 in position with the forward wing nuts 82. The hopper may now be filled with the material desired for distribution.

The modified pivot arrangement for the slide and bottom, shown in FIGURE 11, utilizes a double pivot which permits a complete separation of these members in their open position to aid in cleaning. The general arrangement of basic elements, e.g. rotor 28, frame member 40, and hopper 68, is the same as in the single pivot arrangement shown in FIGURES 3 and 8. However, the bottom member 91 has a tangential loop 93 formed at one end through which a hinge pin 95 is inserted. The hinge pin 95 is secured to the frame member 40 and pivotally supports the bottom member 91. The slide member 97 also has a loop 99 at one end, which loop is offset from tangential to clear the bottom member 91, through which a second hinge pin 101 passes. The hinge pin 101 is attached to the frame, extends parallel to the pin 95, and pivotally supports the slide member 97. The slide and bottom members are, therefore, mounted to pivot between open and closed positions about parallel axes. Since these two members are pivoted about different axes, a much simpler arrangement is possible, and the necessity of intermittent, spaced loops on the same hinge pin is avoided. The slide member 97 is, of course, arranged to shift transversely of the bottom member 91, and is formed with an offset 103 to provide clearance for the loop 93 and pin 95. A flat extension 105 is provided on the free end of the slide member 97. A clamp plate 107, having an offset 109, is provided to engage the lower surface of the frame member 40. The eyebolt and wing nut arrangement, which is the same as that shown in FIGURES 3 and 8, holds the plate 107 tightly against the frame member 40. Thus, the bottom member 91 is supported by the slide member 97, which is in turn supported by the offset 109 on the clamp plate 107. This permits the slide member 97 to be shifted, and, upon release of the clamp plate 107, allows the slide member 97 and the bottom member 91 to pivot, under the influence of gravity, about the pins 101 and 95 respectively to an open position wherein they are completely separated.

The hopper, by virtue of being constructed of fiber glass, is strong, lightweight, corrosion resistant and translucent, all of the properties desirable in a hopper of this type. By providing the hopper with a flange encircling its bottom opening, it may be adapted to a variety of other implements, such as a planter, for example. In addition, the hopper is constructed to incorporate a clamping means therewith so that its attachment to other implements may be easily facilitated.

Various modifications and changes may be made by those skilled in the art without departing from the spirit of the present invention as defined by the scope of the appended claims, wherein it is claimed:

1. In a fertilizer spreader having a wheeled frame, a rotor mounted on the frame and means for driving the rotor in response to rotation of the wheels, the improvement comprising;
- a bottom member having dispensing openings and defining a hopper bottom,
- a slide member having metering openings registerable with said dispensing openings, said slide member being shiftable with respect to said bottom member to regulate the distribution of fertilizer through said openings,
- hinge means for mounting said members on said frame to pivot between an operative, closed position in proximity to the rotor and an open or clean position remote therefrom, and
- latch means engageable between said members and said frame for securing said members in said closed positions and releasable to permit said members to pivot to said open position.

2. In a fertilizer spreader according to claim 1 wherein said hinge means defines a single pivot axis, whereby said members pivot in unison upon release of said latch means.

3. In a fertilizer spreader according to claim 1 wherein said hinge means defines a pair of pivot axes, one of said members pivoting about one of said axes and the other of said members pivoting about the other of said axes, whereby said members are completely separated when said latch is released.

4. In a fertilizer spreader according to claim 1 and further comprising;
- a hopper having an outwardly extending flange around the lower periphery,
- said flange being adapted for support on said frame, and
- said latch means engaging said flange to secure said hopper to said frame.

5. In a fertilizer spreader according to claim 1 wherein said hinge means comprises;
- a hinge pin secured to said frame,
- first intermittent hinge loops on said hopper bottom,
- second intermittent hinge loops on said slide member,
- said loops surrounding said pin and being spaced apart thereon to permit said slide member to shift along said pin relative to said bottom.

6. In a fertilizer spreader according to claim 5 wherein said hopper bottom and said slide member have extended flat sections, said slide member section being shorter than said hopper bottom section, and
- said latch means includes a clamp plate having an offset at least the thickness of said slide member, whereby the clamping force imparted by said latch means is imposed primarily on said hopper bottom thereby allowing said slide member to be shifted.

7. In a fertilizer spreader according to claim 6, wherein said first hinge loops are formed substantially tangential to said hopper bottom and said second hinge loops are displaced from tangential by an amount substantially equal to the thickness of said hopper bottom.

8. In a fertilizer spreader according to claim 7, and further comprising;
- a hopper having an outwardly extending flange around the lower periphery,
- said flange being adapted for support on said frame, and
- said latch means securing said hopper to said frame.

9. In a fertilizer spreader according to claim 8, wherein said hopper has converging transverse walls, a plurality of webs are secured between said walls and said flange,
- said flange, said frame, and said bottom section having slots, and
- said latch means comprises first eyebolts pinned to said webs along the rearward transverse wall and positionable within the slots in said flange and frame, and second eyebolts pinned to said webs along the forward transverse wall and positionable with the slots in said flange, frame and bottom section and extending through said clamp plate, and wing nuts engageable with said eyebolts for securing said hopper to said frame and for holding said clamp plate against said hopper bottom and said slide member.

10. In a fertilizer spreader according to claim 3 wherein said latch means engages said slide member only to support both of said members while permitting said slide member to shift transverse relative to said bottom member.

11. In a fertilizer spreader according to claim 10 wherein said latch means includes a clamp plate having an offset at least the thickness of said slide member, and said clamp plate is positionable against said frame whereby the clamping force imparted to said latch means is imposed primarily on said frame.

References Cited
UNITED STATES PATENTS

| | | | |
|---|---|---|---|
| 388,511 | 8/1888 | Turnipseed | 222—177 |
| 456,418 | 7/1891 | Kirkpatrick | 222—177 |
| 982,848 | 1/1911 | Niebling. | |
| 2,773,626 | 12/1956 | Gandrud | 222—177 X |

SAMUEL F. COLEMAN, *Primary Examiner.*